(12) United States Patent
Ducharme et al.

(10) Patent No.: US 7,486,732 B1
(45) Date of Patent: Feb. 3, 2009

(54) METHOD AND APPARATUS FOR DISTRIBUTED LOAD MULTIPLEXING OF MULTIPLE ENCODED SIGNALS OVER A SHARED COMMUNICATION PATH

(75) Inventors: Paul Ducharme, Scarborough (CA); Indra Laksono, Richmond Hill (CA)

(73) Assignee: Vixs, Inc., Toronto, Ontario (CA)

( * ) Notice: Subject to any disclaimer, the term of this patent is extended or adjusted under 35 U.S.C. 154(b) by 0 days.

(21) Appl. No.: 09/907,053

(22) Filed: Jul. 17, 2001

(51) Int. Cl.
*H04N 7/12* (2006.01)

(52) U.S. Cl. ............ 375/240.14; 370/468; 348/423.1

(58) Field of Classification Search ............ 375/240.14, 375/240.01, 240.28, 240.25, 240.03; 348/385.1, 348/390.1, 423.1, 424.1, 242.1; 370/468, 370/477, 537, 536; 725/95, 116
See application file for complete search history.

(56) References Cited

U.S. PATENT DOCUMENTS

| | | | | |
|---|---|---|---|---|
| 5,877,812 A | * | 3/1999 | Krause et al. | 375/240.25 |
| 5,956,088 A | * | 9/1999 | Shen et al. | 375/240.25 |
| 6,044,396 A | * | 3/2000 | Adams | 725/95 |
| 6,097,435 A | * | 8/2000 | Stanger et al. | 375/240.03 |
| 6,754,241 B1 | * | 6/2004 | Krishnamurthy et al. | 370/537 |

* cited by examiner

*Primary Examiner*—Gims Philippe
(74) *Attorney, Agent, or Firm*—Garlick, Harrison & Markison, LLP; Timothy W. Markison

(57) ABSTRACT

A method and apparatus for distributed load multiplexing of multiple encoded signals over a shared communication path include processing that begins by receiving a $1^{st}$ encoded signal having a $1^{st}$ varying relative bit rate. The processing continues by receiving a $2^{nd}$ encoded signal having a $2^{nd}$ varying relative bit rate. For example, the $1^{st}$ and $2^{nd}$ encoded signals may be an MPEG encoded signal including a plurality of I frames, B frames and P frames. The processing continues by aligning multiplexing of the $1^{st}$ and $2^{nd}$ encoded signals based on reducing cumulative peak bit rates of the $1^{st}$ varying relative bit rate and the $2^{nd}$ varying relative bit rate. For example, the $2^{nd}$ encoded signal may be delayed via buffering to ensure that the I frames of the $1^{st}$ and $2^{nd}$ encoded signals are misaligned.

13 Claims, 12 Drawing Sheets

72, 74, 76

78, 80, 82

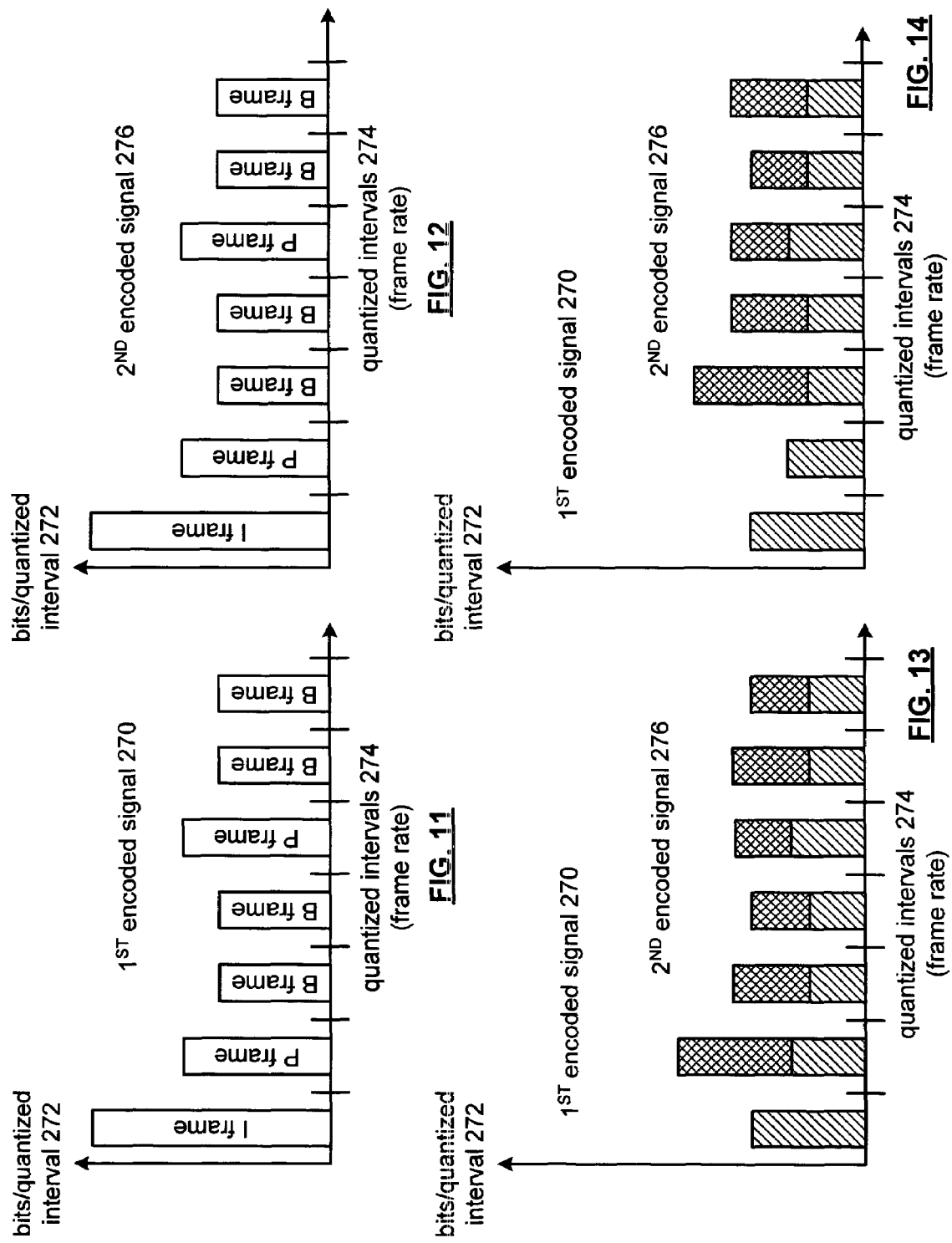

METHOD AND APPARATUS FOR DISTRIBUTED LOAD MULTIPLEXING OF MULTIPLE ENCODED SIGNALS OVER A SHARED COMMUNICATION PATH

TECHNICAL FIELD OF THE INVENTION

This invention relates generally to communication systems and more particularly to video-on-demand systems.

BACKGROUND OF THE INVENTION

Video-on-demand systems are known to deliver video and audio content to specific customers over a shared broadband network. A typical embodiment of a video-on-demand (VOD) system is illustrated in FIG. 1.

FIG. 1 illustrates a VOD system 10 that includes a plurality of redundant array of independent disks (RAID) 18–24, a video-on-demand distribution system 12, a plurality of quadrature amplitude modulation (QAM) modules 26–34, and a control computer 16 operably coupled to a plurality of set-top boxes 36–44 via a cable network 14. The video-on-demand distribution system 12 includes a plurality of servers 46–52 and a plurality of statistical multiplexors 54–60.

Each of the redundant array of independent disks are known to comprise a large disk storage system that provides vast amounts of data storage for storing video and audio programs in digital form. Each redundant array of independent disks also includes an interface that allows access to the data. Such an interface is typically a small computer system interface (SCSI) or an integrated drive electronics (IDE) interface, which allows data to be retrieved at rates of 14 to 30 megabytes per second. The control computer 16 is operably coupled to receive requests for access to one or more programs stored in the plurality of RAIDs 18–24 from the plurality of set-top boxes 36–44. The control computer 16 provides the request to the appropriate server 46–52 for retrieval of the particular program. As is known, each RAID 18–24 stores a program or plurality of programs in a non-redundant fashion to provide as many selections as possible within the system 10. Accordingly, since each server is associated with a particular RAID 18–24, the appropriate server is addressed to retrieve a particular program.

The control computer 16 also provides the server with the identity of a particular statistical multiplexor 54–60 to utilize. Typically, the server 46–52 will be operably coupled to the statistical multiplexors 54–60 via an alternate space inversion (ASI) connection, which basically includes modulated fixed bit rate binary streams containing MPEG transport streams. Such ASI interfaces may operate at rates up to 240 megabits per second in a point-to-point connection. Such ASI interfaces are expensive, in the range of $4,000.00 per interface.

The statistical multiplexors 54–60 receive a stream of MPEG transport data and provide it to an associated QAM module 26–32. As is known, a statistical multiplexor manipulates input transport streams to generate output transport streams that squeeze more digital data into a single transport stream at a fixed output data rate. Such statistical multiplexors typically support multiple ASI inputs and one ASI output. Currently, a statistical multiplexor is very expensive costing in the range of $40,000.00 per multiplexor.

The QAM modules 26–32 modulate the incoming data into separate analog bands of RF (radio frequency) each occupying a 6 Mhz wide spectrum. Note that the 6 Mhz wide spectrum corresponds to a single NTSC/PAL analog channel. The QAM modules utilize a 256 QAM modulation scheme, which results in a bandwidth of 38.5 megabits per second. As is further known, the rates of an MPEG stream can vary not only based on quantization, frame size and pixels, but that instantaneous data rates within a single stream can vary greatly. Typically, multiple programs are multiplexed together to share the available 3.5 megabits per second bandwidth.

The QAM modulated data is provided to the cable network 14, which demodulates the data and distributes the demodulated data to the requesting set-top box 36–44.

While the video-on-demand system of FIG. 1 provides a stream of video and audio to requesting users, the system is limited by the nature of its design. For example, as the demand for an individual program increases, the video-on-demand system will bottleneck at approximately 12 requests for the individual program. This bottlenecking occurs because of the bandwidth limitation between the servers 46–52 and the statistical multiplexors 54–60 and the bandwidth limitation between the statistical multiplexors 54–60 and the quadrature amplitude modulators 26–32. As previously mentioned, the bandwidth of the path between the statistical multiplexor and QAM is approximately 38.5 megabits per second. In addition, MPEG video data has a rate of approximately 1.5 megabits/sec to 8 megabits/sec averaging approximately 2 megabits per second. As such, each path between a server statistical multiplexor and quadrature amplitude modulation module can support only 12 MPEG video and audio streams.

As is known, MPEG video and audio includes a repetitive pattern of intra frames (I frames), predicted frames (P frames), and bi-directional frames (B frames). Typically, each I frame includes approximately 20 kilobytes of data, each P frame includes approximately 5 kilobytes of data and each B frame includes approximately 2 kilobytes of data. It is further known that the distance between two I frames is known as a group of pictures and that the video material is typically encoded with a constant group of pictures for a given piece of video equipment. In the system of FIG. 1, when multiple streams are multiplexed into a single transport stream, there is a high variability in the data rates of the input streams such that the data rate of the output stream varies greatly. As such, the bandwidth utilization must be derived based on worse case analysis, which occurs when the I frames of each retrieved program are aligned. Other issues with the efficiency of the video-on-demand system of FIG. 1 include program/RAID bottlenecks, server bottlenecks, QAM bottlenecks, statistical multiplexor bottlenecks, scalability, and reliability.

Program/RAID bottlenecks occur when a particular program or group of programs resides on a single RAID disk and multiple users are requesting the program or group of programs. When this occurs, the individual SCSI or IDE interface to the RAID system is limited to 240 megabits per second, thus limiting the number of users which may access the program or group of programs at one time.

Server bottlenecks occur when a particular program or group of programs resides on a single server and multiple user's request the particular program where a server is limited by the ASI output of approximately 240 megabits per second. Thus, to provide a greater bandwidth, a server is required to include multiple ASI interface cards, which dramatically increases the cost of such servers.

QAM bottlenecks occur when a large number of programs are directed to a particular QAM module, which then becomes the limiting factor. A typical solution for this bottlenecking is to use the ASI interface in a multi-drop mode (which is a violation of the ASI specification DUB-PI EN 50083-9:1998) in order to facilitate sending programs from any of the servers to any QAM module.

Statistical multiplexor bottlenecks occur when each statistical multiplexor typically delivers an MPEG stream of data that includes up to 12 programs to 1 QAM module. As such, for every 12 customers a statistical multiplexor is required. As previously mentioned, such statistical multiplexors are very expensive devices.

The video-on-demand system of FIG. 1 is limited in scalability based on the number of QAM channels and statistical multiplexors. Reliability of the system of FIG. 1 is limited due to the ASI interfaces, which are typically low volume specialty devices that have relatively low mean time between failure ratings. Also, when the ASI interfaces are operated in a multi-drop mode, the reliability of the entire system may be compromised.

Therefore, a need exists for a method and apparatus that provides a scalable, reliable video-on-demand system that overcomes the above-mentioned issues of current video-on-demand systems.

BRIEF DESCRIPTION OF THE DRAWINGS

FIGS. 11–14 illustrate a graphical representation of multiplexing a plurality of encoded video signals in accordance with the present invention.

DETAILED DESCRIPTION OF A PREFERRED EMBODIMENT

Figure 1:
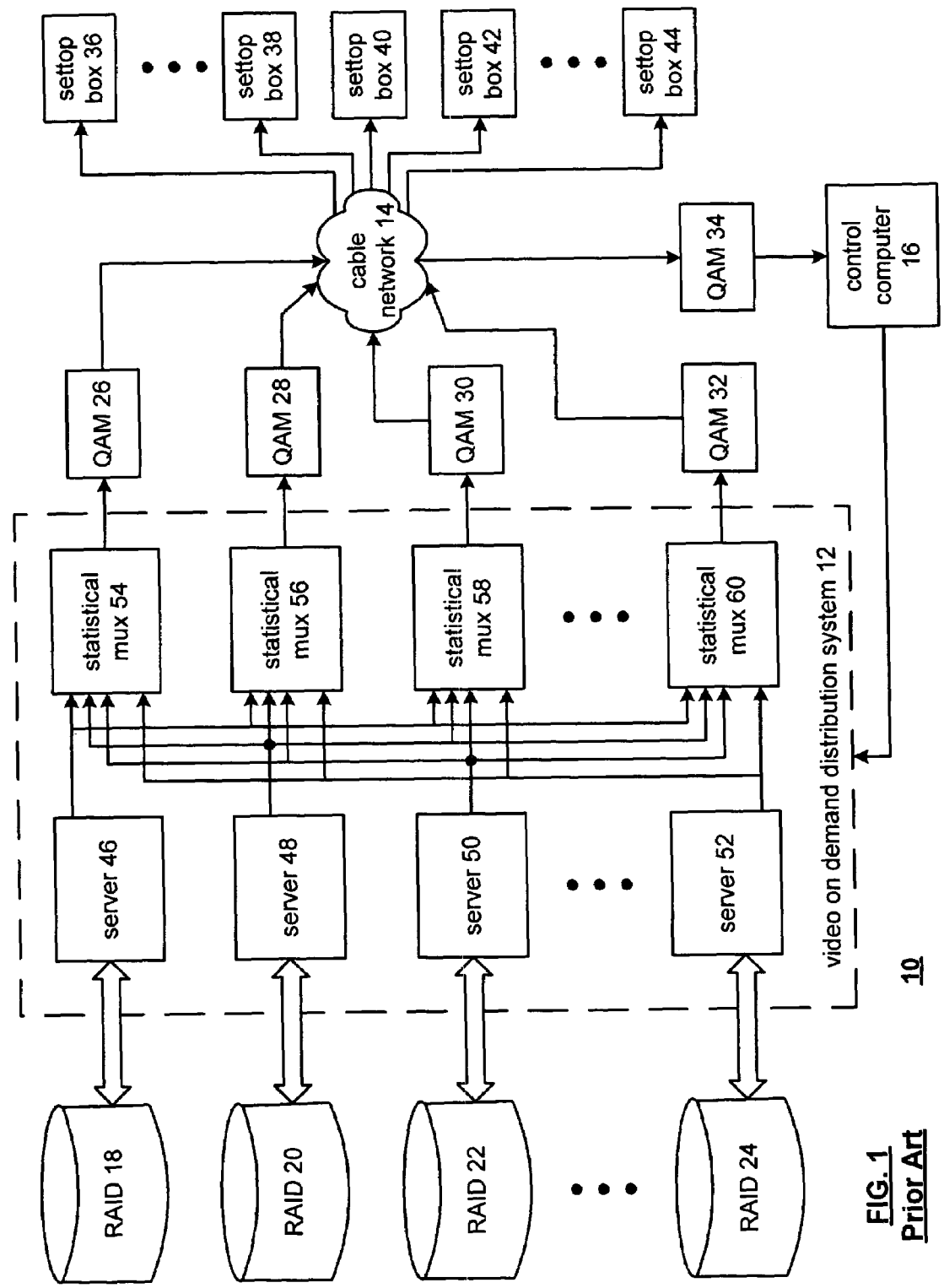
FIG. 1 illustrates a schematic block diagram of a prior art video-on-demand system.

Generally, the present invention provides a method and apparatus for distributed load multiplexing of multiple encoded signals over a shared communication path. Such a method and apparatus include processing that begins by receiving a $1^{st}$ encoded signal having a $1^{st}$ varying relative bit rate. For example, the $1^{st}$ encoded signal may be an MPEG encoded signal including a plurality of I frames, P frames and B frames arranged in group of pictures. Over a group of pictures, the bit rate of each of the frames varies, which corresponds to the varying relative bit rate. The processing continues by receiving a $2^{nd}$ encoded signal having a $2^{nd}$ varying relative bit rate. For example, the $2^{nd}$ encoded signal may be an MPEG encoded signal including a plurality of I frames, B frames and P frames.

The processing continues by aligning multiplexing of the $1^{st}$ and $2^{nd}$ encoded signals based on reducing cumulative peak bit rates of the $1^{st}$ varying relative bit rate and the $2^{nd}$ varying relative bit rate. For example, the $2^{nd}$ encoded signal may be delayed via buffering to ensure that the I frames of the $1^{st}$ and $2^{nd}$ encoded signals are misaligned. With such a method and apparatus, bandwidth of multiplexing multiple encoded signals within a video-on-demand system is substantially reduced thus allowing a greater number of programs to be more efficiently processed within a video-on-demand system.

The present invention can be more fully described with reference to FIGS. 2 through 15. FIG. 2 illustrates a schematic block diagram of a video-on-demand system 70 that includes a plurality of redundant array of independent disks (RAID) 94–98, a plurality of servers 72–76, and a plurality of splicers 78–82, and a controller 92 operably coupled to a plurality of quadrature amplitude modulation (QAM) modules 84–90, a cable network 14, and a plurality of set-top boxes 36–44. The construct of RAIDs 94–98 is similar to RAIDs 18–24 of FIG. 1. RAIDs 94–98, however, store video frame delineation information for each video program. The video frame delineation information indicates the boundaries for frames (or packets) of video stored in the RAIDS. For example, the frame delineation information may identify the beginning and/or ending of each MPEG frame of an MPEG encoded video program. As is known, an MPEG encoded video program includes 3 types of frames, an intra frame (I frame), predicted frames (P frames), and bi-directional frames (B frames). In addition, all programs stored in the RAIDs are encoded with the same group of picture structure and have the same frame rate.

In general, the servers 72–76, in accordance with commands 108 and interface control 110, provide data (e.g., video packets) to the splicers 78–82 in a manner that maximizes the bandwidth of the interconnections between the servers and splicers based on the frame delineation information. In addition, the organization of the data being conveyed to the splicers also better utilizes the connection between splicers 78–82 and QAM modules 84–88.

The servers 72–76 will be described in greater detail with reference to FIG. 3, but its operation will be generally described now. In general, the servers 72–74 are operably coupled to a corresponding RAID 94–98, operably coupled to each other via an up-connection (indicated by the arrow pointing up) and a down-connection (indicated by the arrow pointing down). In addition, each of the servers 72–76 is operably coupled to at least one of the splicers and in this illustration is operably coupled to two splicers. As configured, the servers 72–76 process client commands 108 to retrieve specific video programs from its corresponding RAID 94–98 and provide the video program in a controlled manner to one or more of splicers 78–82 in a manner that maximizes the bandwidth of the interconnections between the elements of the system 70.

The servers are programmed to minimize bottlenecking within the video-on-demand system 70 by utilizing the frame delineation information (e.g., frame boundaries of MPEG encoded data) to ensure that high bit rate frames (e.g., I frames of MPEG encoded data) of different programs are not aligned. This will be discussed in greater detail with reference to FIGS. 10–15. In addition, to better distribute the loading throughout system 70 when multiple requests are received for an individual program, the server associated with the RAID storing the program provides copies to one or more of the other servers. The other servers store the program in its corresponding RAID such that each server having a copy of the program in its RAID supports a request for the program. As such, the bottlenecking of the past embodiments of video-on-demand systems is substantially overcome by the system 70 of FIG. 2.

The construct and detailed operation of controller 92 will be described in greater detail with reference to FIG. 5, but will generally be described now. In general, controller 92 is operably coupled to receive client requests 100 via a receive QAM module 92 and a cable network 14, in-home network, in-building network, or other such types of networking hubs. Unless specifically stated otherwise, a cable network in-home network, in-building network, or other such types of networking hubs may be used interchangeably with respect to the present invention. Controller 92 processes the client requests to produce commands 108. As previously mentioned, the commands 108 are provided to servers 72–76 to instruct the server to obtain a specific video program from its corresponding RAID and further may indicate which splicer to provide the data to.

In order to provide the information as to which splicer the server is to provide the data to, the controller 92 maintains a record of the current loading of splicers 78–82. As such, by monitoring the available bandwidth of each of the splicers 78–82, the controller may instruct a specific server to use a specific splicer to balance the loading within system 70. As one of average skill in the art will appreciate, the interface with QAM modules 84–88 has a specific bandwidth limitation based on the QAM modulation scheme used. For example, 256 QAM modulation provides a bandwidth limitation of 38.5 megabits per second. By knowing the data rate of a particular program (e.g., 1.5 Mbps to 8 Mbps for MPEG encoded data) and the number of programs each splicer is processing, the controller 92 may readily determine the available bandwidth for each of the splicers within system 70. Based on this information, the controller 92 may readily determine which splicer has the most available bandwidth and should process the present video programming request.

The controller 92 also generates synchronization information 106 that is provided to servers 72–74 and/or splicers 78–82. The synchronization information 106 in generally provides a system reference clock, a frame clock, and a quantized interval clock for system 70, wherein the system reference clock is based on the bit rate of the interconnections within the system. For example, the system reference clock may be 24–480 MHz, which corresponds to the bit rate of the connection between the RAIDs and the servers, between the servers and the splicers, and/or between the splicers and the QAM modules. The frame clock is based on the system clock and the number of bits in a frame of encoded data. For example, the frame clock may be one-two thousandths, one-five thousandths, and/or one-twenty thousandths of the system clock. The quantized interval clock is based on the frame rate of the encoded data, which determines how many programs can be supported by a single connection within the system.

For example, assume that each quantized time interval will support one I frame (20 Kbytes per frame) and an even number of P frames (5 Kbytes per frame) and B frames (2 Kbytes per frame), the frame rate is 60 Hz, and the system clock is 24 MHz. Thus, each quantized time interval is $\frac{1}{60}^{th}$ of a second. As such, each quantized time interval includes 24 MHz/60=400 thousand clock cycles per interval. Accordingly, each quantized time interval will support 400 Kbps of data or 50 Kbytes of data. Twenty of the fifty Kbytes of data is consumed by the I frame, leaving 30 Kbytes for the P and B frames. Assuming an equal number of P and B frames, the quantized interval can support 4 P frames and 4 B frames. Thus, 8 video programs per connection may be supported by this example system. In contrast, the video on demand system of FIG. 1 with a 24 MHz system clock could only support 2 video programs per connection since it cannot be guaranteed that two I frames will not fall within the same quantized time interval.

The splicers 78–82 are illustrated in greater detail with reference to FIG. 4, but will be generally described now. In general, the splicers receive a plurality of video packets 102 from one or more of the servers 72–74, wherein the video packets may be for one or more video programs. The video packets represent a particular video program. For video packets from different programs, the splicers 78–82 interleave the video packets 102 of one program with the video packets of other programs. The splicer 78–82 outputs interleaved video packets 104 such that the I frames of the different programs do not coincide. The splicer provides the interleaved video packets 104 to its associated QAM module 84–88. The QAM modules modulate the interleaved video packets and provide the modulated data to the cable network 14. The cable network 14 demodulates the video data and distributes the appropriate programs to the requesting set-top boxes 36–44.

As one of average skill in the art will appreciate, by synchronizing and operating at the frame level of encoded data (e.g., MPEG encoded data) as opposed to the prior art approach of utilizing a program identifier header and fixed 188 byte-sized packets and system level information, which is transported in separate packets, the present invention allows for better utilization of the bandwidth coupling the elements within system 70 together. As such, the splicers and servers of FIG. 2 may support more programs than in the video-on-demand system of FIG. 1.

As one of average skill in the art will further appreciate, the cable network 14 may be replaced by an in-home network connection or an in-office network connection. As such, system 70 is a self-contained system within a home or within an office for retrieval of data. The data may include a video component and for the purposes of implementation, video data is inclusive of video data, audio data, text data and other forms of multimedia data. As such, RAIDs 94–98 may store audio data, video data, and/or text data as a video program.

As one of average skill in the art will still further appreciate, system 70, if an in-home or in-office system, may omit the QAM modules 84–90 and the cable network 14 and replace with an Ethernet, or local area network, connection. As such, each of the splicers and the controller 92 would be operably coupled to the local area network connection as well as each of the set-top boxes 36–44. Accordingly, each device coupled to the local area network connection would follow the local area network connection protocols. For example, the local area network connection may be a 10 Base T Ethernet connection, 100 Base T Ethernet connection, and/or any of the other types of Ethernet connections or other local area network protocols.

Figure 3:
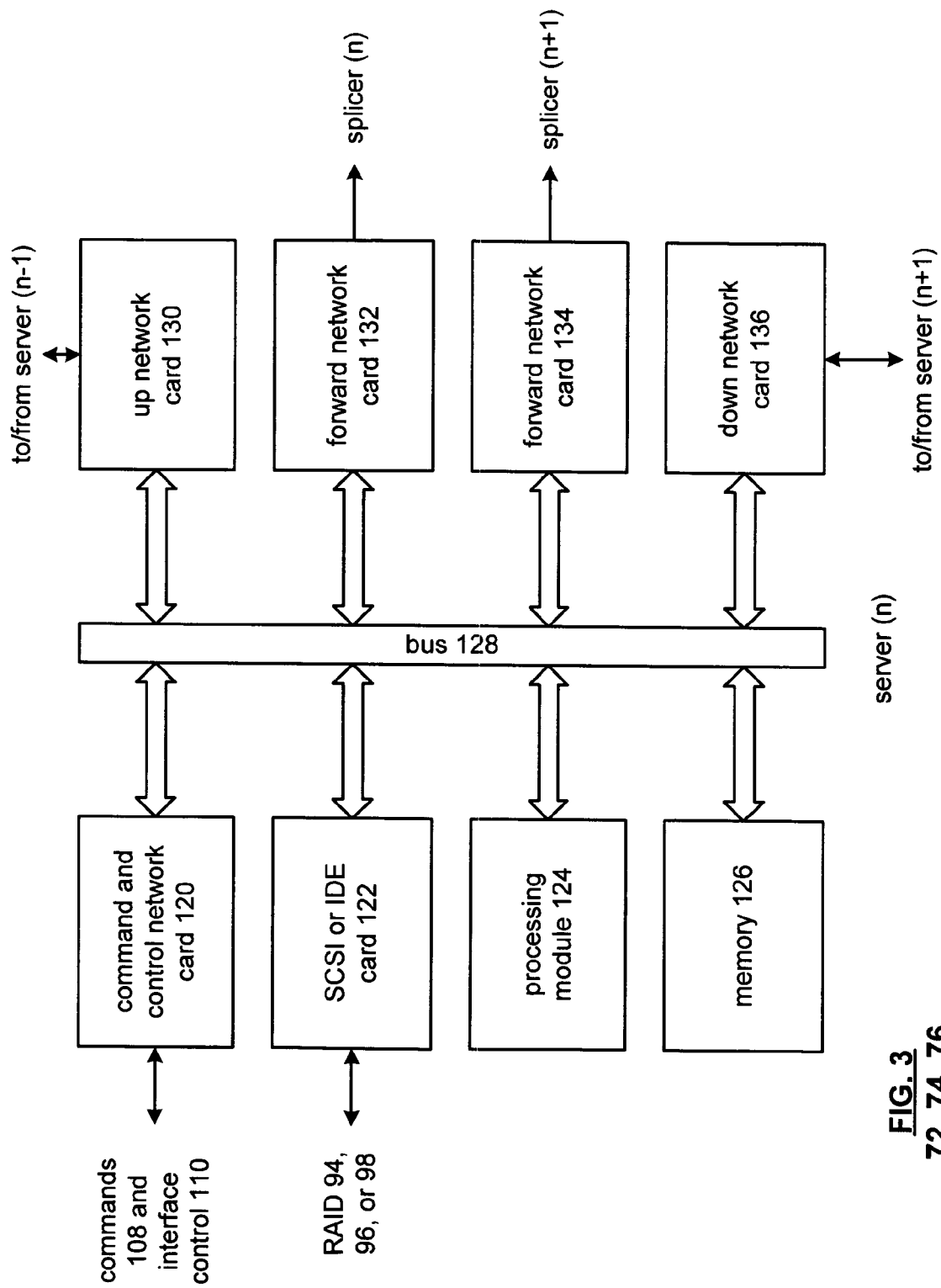
FIG. 3 illustrates a schematic block diagram of a server in accordance with the present invention.

FIG. 3 illustrates a schematic block diagram of a server 72, 74 or 76. The server (n) includes a command and control network card 120, an SCSI or IDE card 122, a processing module 124, memory 126, an interconnecting bus 128, an upwards network card 130, a plurality of forward network cards 132–134, and a downward network card 136. The processing module 124 may be a single processing device or a plurality of processing devices. Such a processing device may be a microprocessor, microcomputer, digital signal processor, central processing unit, programmable gate array, programmable logic device, state machine, logic circuitry, and/or any device that manipulates signals (analog and/or digital) based on operational instructions. The memory 126 may be a single memory device or a plurality of memory devices. Such a memory device may be a volatile memory device, non-volatile memory device, static memory device, dynamic memory device, read-only memory, random access memory, magnetic tape memory, flash memory, and/or any device that stores digital information. The operational instructions stored in memory 126 and executed by processing module 124 enable the servers 72–76 to process commands 108 and the interface control 110. The details of the operational instructions executed by processing module 124 will be described below with reference to one or more of FIGS. 7–15.

Each of the cards 120, 122, 130–136 may be an Ethernet card such as a 100 Base T Ethernet card to provide connectivity with external devices. For example, the command and control network card 120 is operably coupled to the controller 92 for the reception of commands 108 and interface control 110. The interface control 110 information indicates which network card is to be utilized based on the particular splicer assigned to receive the data. In addition, the interface control 110 may indicate that the particular video program is to be also copied to a corresponding server in the upward direction via the upward network card 130 or in the downward direction via the downward network card 136.

The SCSI or IDE card 122 provides coupling with the corresponding RAID 94, 96 or 98. Such coupling is known, thus no further discussion will be presented except to further illustrate the concepts of the present invention.

Each of the plurality of forward network cards 132–134 is operably coupled to separate splicers (e.g., splicer n and splicer n+1). Each of the forward network cards 132–134 may be an Ethernet card such as a 100 Base T Ethernet connection. In this embodiment, the forward network cards 132 and 134 are coupled and function as a transmit-only network card. As such, for a 100 Base T Ethernet network card, approximately 100 megabits of information may be conveyed from the server to the corresponding splicer.

The upward network card 130 couples server (n) with server (n−1), i.e., the server above the present server, from a graphical representation standpoint. The up network card 130 may be an Ethernet card such as a 100 Base T Ethernet connection. The Ethernet connection is utilized in both the receive and transmit directions thus following the appropriate Ethernet protocol for conveyance of bi-directional data.

The downward network card 136 provides connectivity between the current server, i.e., server (n), and the down server—server (n+1), i.e., the server graphically represented below the current server. The downward network card 136 may be an Ethernet card such as a 100 Base T Ethernet card. The downward network card 136 provides connectivity between server (n) and server (n+1), such that data may be transmitted and received data there between. As previously mentioned, by coupling the servers together, video programs may be transferred from server-to-server and subsequently stored in the corresponding RAID of a particular server. This feature allows for better distribution of supporting multiple requests for the same program.

Figure 2:
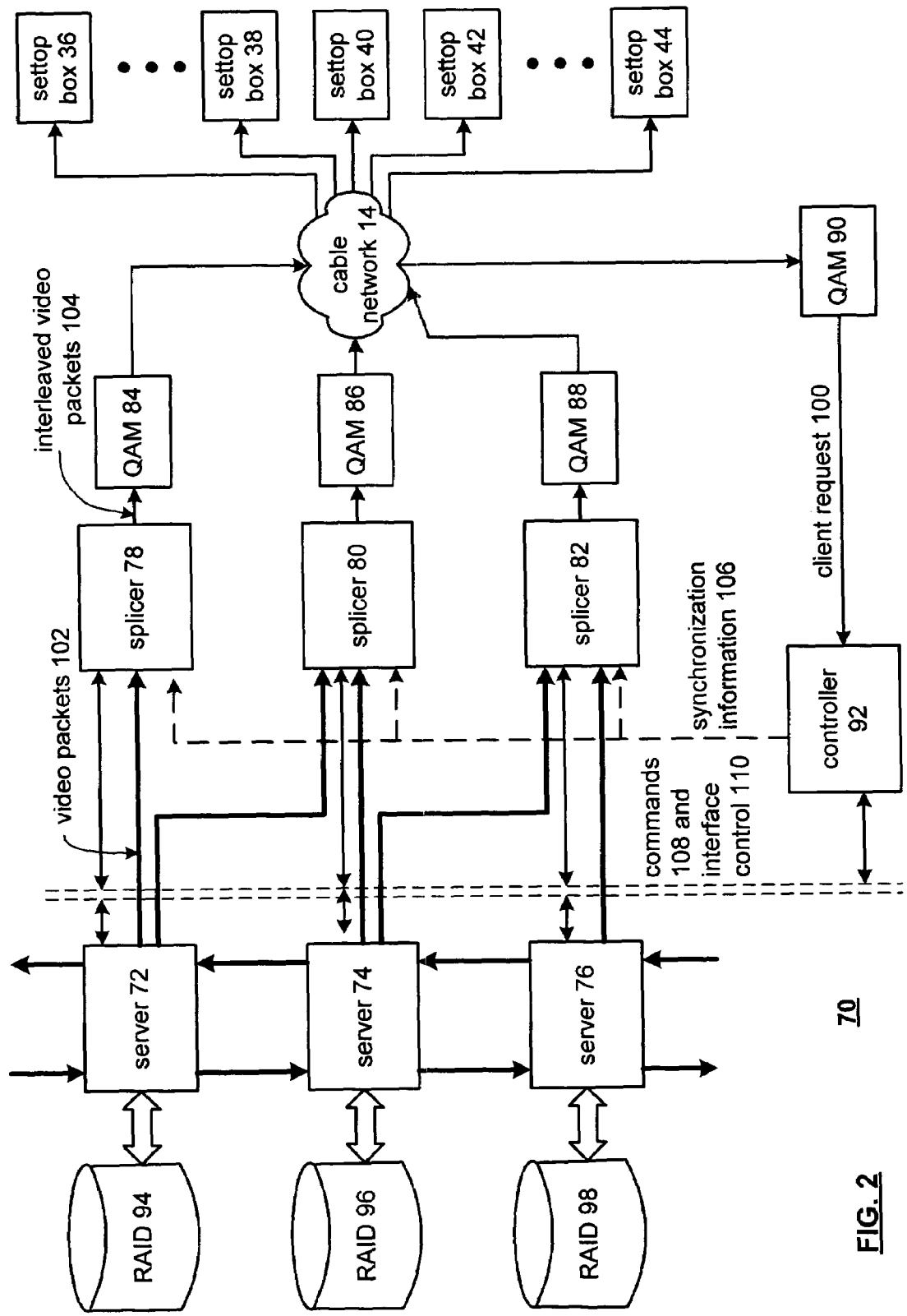
FIG. 2 illustrates a schematic block diagram of a video-on-demand system in accordance with the present invention.

As one of average skill in the art will appreciate, by replacing an ASI interconnection and a QAM interconnection, the cost of servers 72–76 is substantially less than the corresponding servers in FIG. 1. Currently, an Ethernet network card costs approximately $20.00 in comparison with the estimated cost of approximately $4,000.00 per ASI interface.

Figure 4:
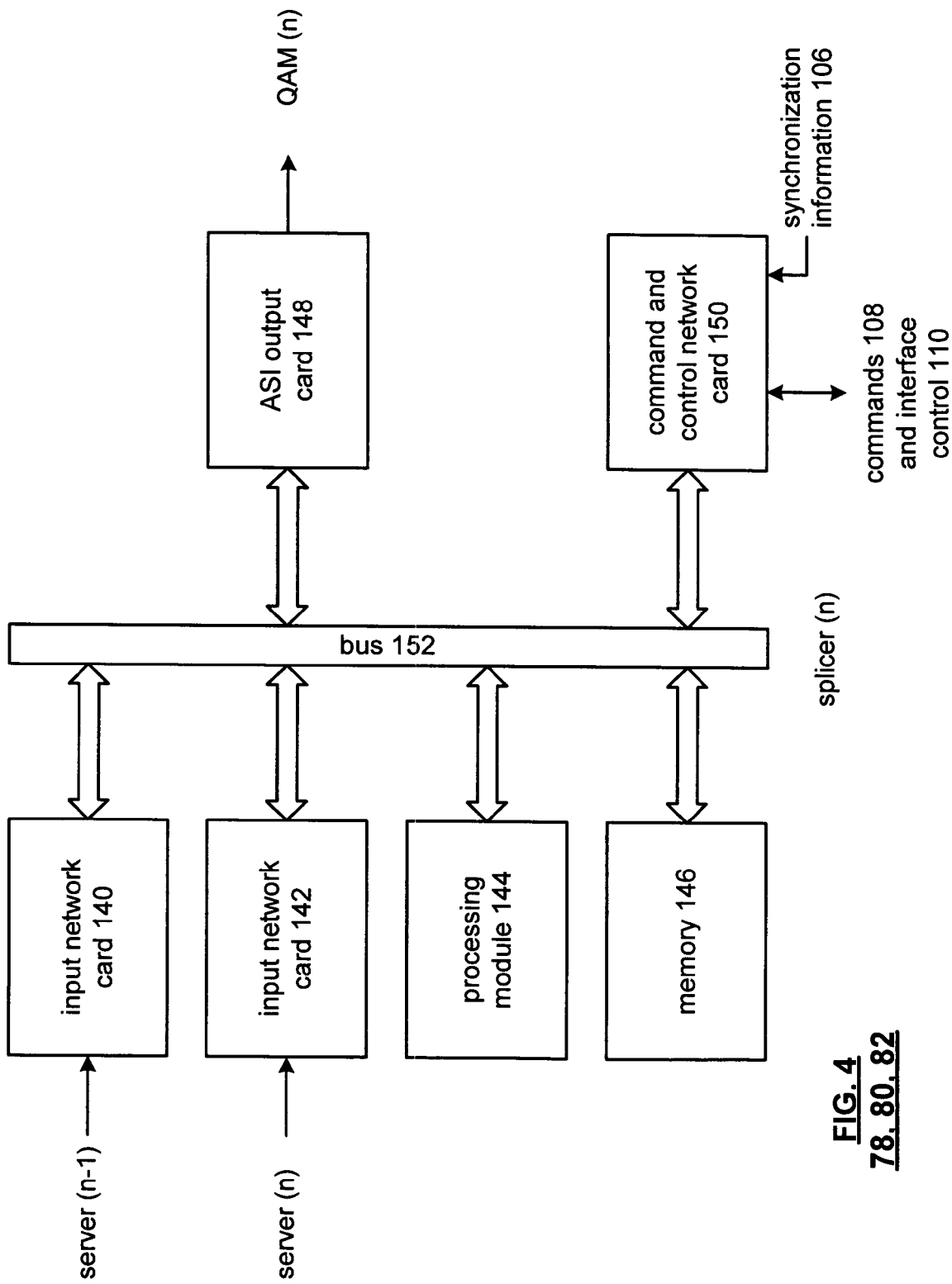
FIG. 4 illustrates a schematic block diagram of a splicer in accordance with the present invention.

FIG. 4 illustrates a schematic block diagram of a splicer 78–82. The splicer (n) includes an interface to one or more servers (which includes input network cards 140 and 142), processing module 144, memory 146, ASI output card 148, and command and control network card 150. The processing module 144 may be a single processing device or a plurality of processing devices. Such a processing device may be a microprocessor, microcontroller, microcomputer, central processing unit, digital signal processor, programmable logic array, programmable logic device, state machine, logic circuitry, and/or any device that manipulates signals (analog and/or digital) based on operational instructions. The memory 146 may be a single memory device or a plurality of memory devices. Such a memory device may be a volatile memory device, non-volatile memory device, static memory device, dynamic memory device, random access memory, read-only memory, magnetic tape memory, flash memory, and/or any device that stores digital information. The operational instructions stored in memory 146 and executed by processing module 144 are generally illustrated in FIGS. 7–15 wherein at least some of the operational steps illustrated in these figures are executed by processing module 144.

The server interface, which includes input network cards 140 and 142, couples the splicer to one or more servers. In this illustration, the splicer is operably coupled to 2 servers. The input network cards 140 and 142 may be Ethernet cards, such as a 100 Base T Ethernet network card. The network cards are operably coupled to bus 152, which couples each of the components within splicer (n) together.

The ASI output card 148 provides coupling between splicer (n) and the corresponding QAM module. The operation of an ASI output card 148 is known, thus no further discussion will be presented except to further illustrate the concepts of the present invention.

The command and network card 150 operably couples the splicer to controller 92. The command and network card 150 may be an Ethernet card such as a 100 Base T, which allows the splicer to receive commands 108 and interface control data 110, and the synchronization information 106. Based on these inputs, the splicer interleaves received video packets from various programs from servers (n−1) and (n) and provides the interleaved video packets to the associated QAM via the ASI output card 148.

Figure 5:
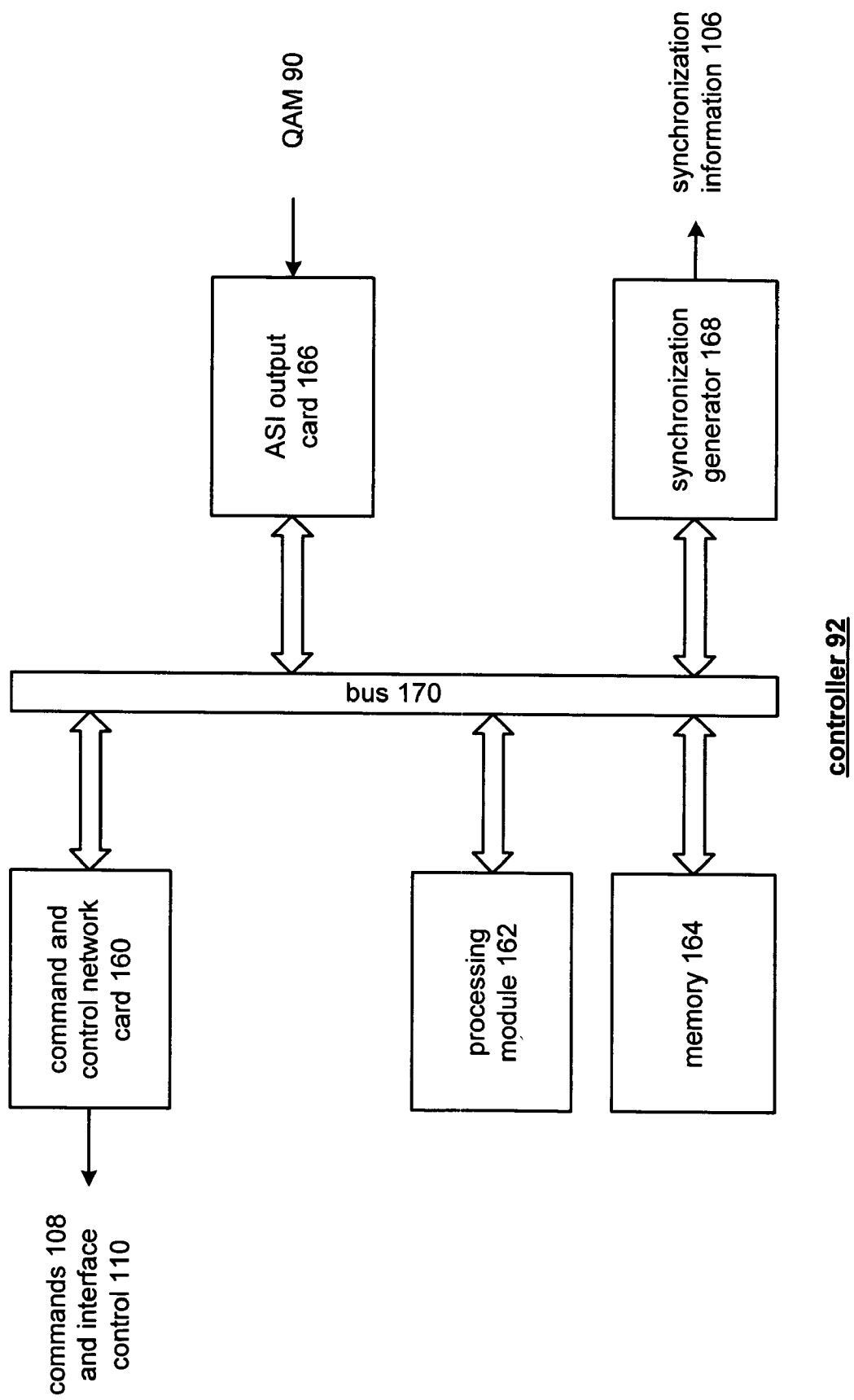
FIG. 5 illustrates a schematic block diagram of the controller in accordance with the present invention.

FIG. 5 illustrates a schematic block diagram of controller 92. Controller 92 includes a command and control network card 160, processing module 162, memory 164, an ASI input card 166, a synchronization generator 168 and bus 170. The processing module 162 may be a single processing device or a plurality of processing devices. Such a processing device may be a microcontroller, microcomputer, microprocessor, digital signal processor, central processing unit, programmable logic device, programmable logic array, state machine, logic circuitry, and/or any device that manipulates signals (analog and/or digital) based on operational instructions. The memory 164 may be a single memory device or a plurality of memory devices. Such a memory device may be a non-volatile memory, volatile memory, static memory, dynamic memory, random access memory, read-only memory, and/or any device that stores digital information. The operational instructions executed by processing module 162 and stored in memory 164 are generally illustrated in FIGS. 7–15, wherein the processing module 162 performs at least some of the processing steps.

The command and control network card 160, which may be an Ethernet card such as a 100 Base T Ethernet connection allows the controller 92 to provide commands and interface control information 110 to the servers and/or to the splicers. The processing module 162, while executing the appropriate operational instructions, produces the commands 108 and interface control 110.

The ASI input card 166 allows the controller 92 to be operably coupled to a receive QAM 90. The operation of an ASI input card is known, thus no further discussion will be presented except to further illustrate the concepts of the present invention.

The synchronization generator 168 enables the controller 92 to produce the synchronization information 106. The synchronization information, as previously mentioned, includes a quantized time interval, a system clock, and framing information. Accordingly, the synchronization generator 168 includes a $1^{st}$ clock to generate the system clock, synchronization circuitry, such as a phase lock loop, to generate the quantized time intervals, and a $2^{nd}$ phase lock loop to produce the framing information. The generation of a clock from a crystal as well as generating synchronized clocks via phase lock loops is known in the art, thus no further discussion will be presented except to further illustrate the concepts of the present invention.

As one of average skill in the art will appreciate, by replacing ASI network cards with Ethernet cards as previously described in reference to FIGS. 2–5, the overall cost of a video-on-demand system is substantially reduced. In addition, by utilizing some of the Ethernet cards in a unidirectional manner, data throughput is maximized via these network connections.

Figure 6:
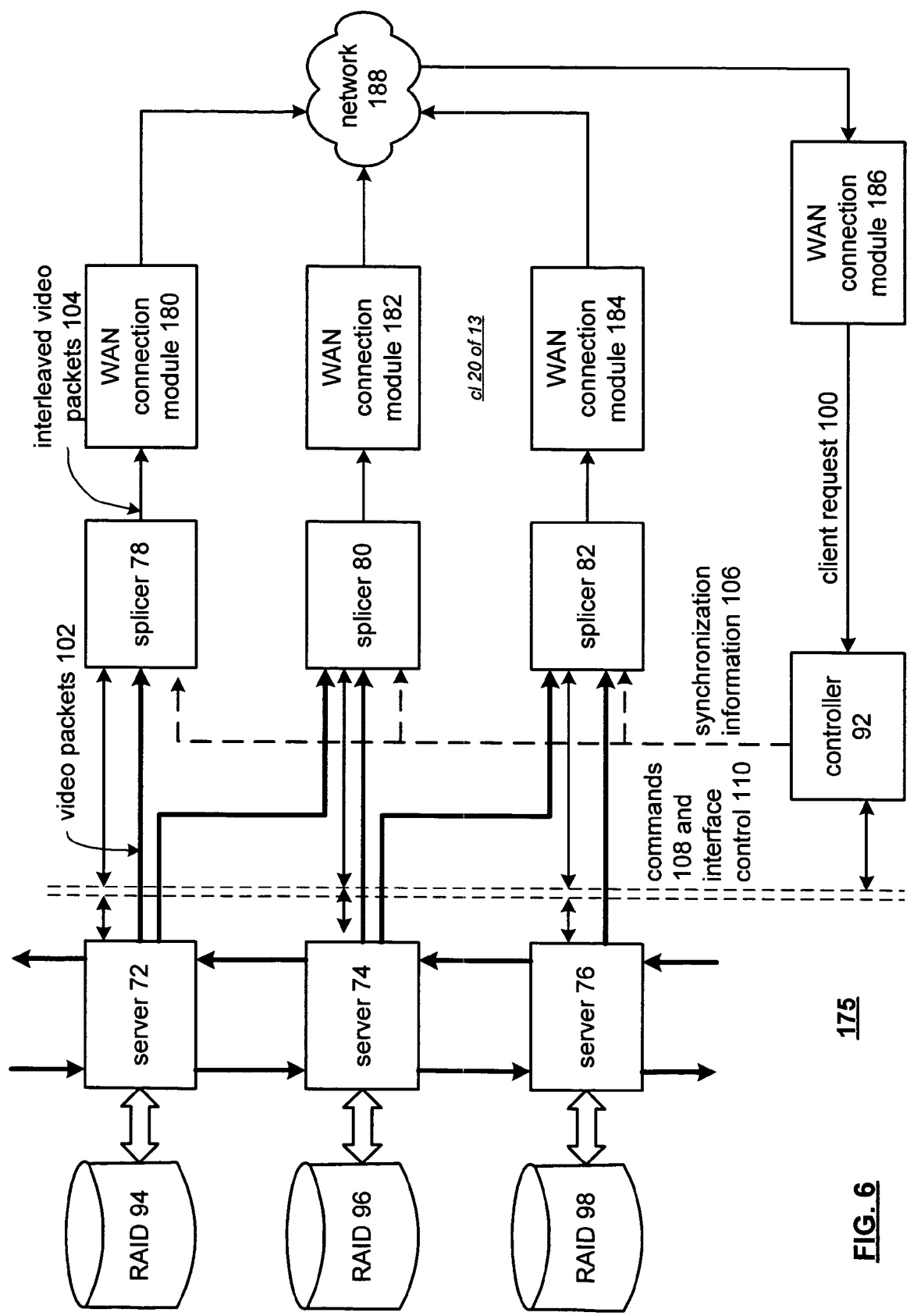
FIG. 6 illustrates a schematic block diagram of an alternate video-on-demand system in accordance with the present invention.

FIG. 6 illustrates a schematic block diagram of an alternate video-on-demand system 175. The system 175 includes the RAIDs 94–98, the servers 72–76, and the controller 92, the splicer 78–82 operably coupled to a plurality of wide area network connection modules 180–186 that are in turn coupled to network 188. The network 188 may be the public switch telephone network, the internet, cable network, local area network, wide area network, and/or a combination thereof. The controller 92, splicers 78–82, servers 72–76 and RAIDs 94–98 operate as previously discussed with reference to FIGS. 2–5.

The splicers 78–80 output interleaved video packets 104, which are provided to a corresponding wide area network connection module 180–184. The wide area connection module 180–184 may be a cable modem, DSL modem, ISDN modem, T1 connection, E1 connection, and/or any other connection to a publicly accessible network. For example, the wide area network connection module 188 may be an asynchronous transfer mode (ATM) module that is operably coupled to convert the interleaved video packets 104 into ATM packets, a SONET module operably coupled to produce SONET packets from the interleaved video packets, a DSL modem operably coupled to produce DSL packets from the interleaved video packets, and/or an internet packet module operably coupled to produce IP packets from the interleaved video packets. As shown, the wide area connection module 186 is operably coupled to receive client requests via network 188 and produce the client request 100 to controller 92. The construction and operation of the wide area connection module 188 may be similar to that of wide area network connection modules 180–184.

Figure 7:
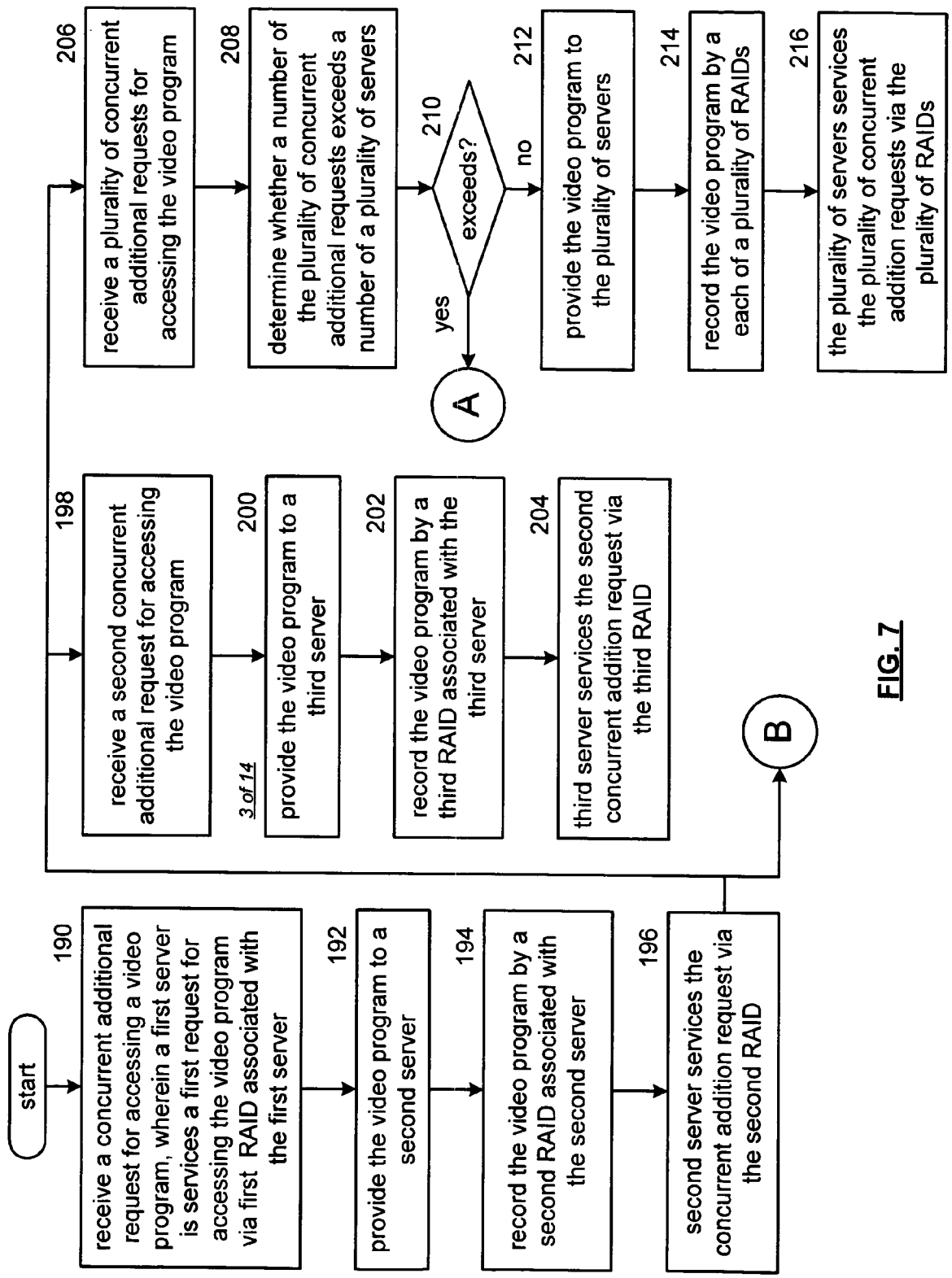
FIGS. 7 and 8 illustrate a logic diagram of a method for providing video programs to a plurality of users in accordance with the present invention.

FIG. 7 illustrates a logic diagram of a method for distributing video-on-demand loading within a video demand system as shown in FIG. 2 or 6. The processing modules of the controller, servers, and/or splicers may execute the processing steps shown in FIGS. 7 and 8. The processing begins at Step 190 where a concurrent additional request for accessing a video program is received. In this instance, the video program is currently being processed by a $1^{st}$ server, which is supporting the request via its associated RAID, when another request for the video program is received. Note that multiple requests for the video program may be received while the $1^{st}$ server is processing the first non-overlapping request (i.e., when this request was made for the program, no other requests where being processed for the program) for the video program.

The process then proceeds to Step 192 where the video program is provided to a $2^{nd}$ server via an up or down connection between the first and second servers. Note that the controller selects the second server based on up/down server business and then instructs the first server to provide a copy of the video program to the second server.

The processing then proceeds to Step 194 where the $2^{nd}$ server causes the video program to be recorded within the RAID associated with the $2^{nd}$ server. This is done in accordance with control information provided by controller. The processing then proceeds to Step 196 where the $2^{nd}$ server services the concurrent additional request utilizing its associated RAID by providing the video packets of the video program to an allocated splicer in accordance with control information provided by the controller. With such a process, when two or more requests for the same program are received, the controller distributes servicing of the requests among the servers to balance loading of the system. In addition, each server, once it has a copy of the video program acts independently, based on control information from the controller, to service requests.

The process then may proceed in one of many directions. For instance, the processing may proceed to Steps 198–204, to Steps 206–216, and/or to Steps 226 or 228. At Step 198, a $2^{nd}$ concurrent additional request is received for accessing the video program. The process then proceeds to Step 200 where the $1^{st}$ or $2^{nd}$ server provides the video program to a $3^{rd}$ server. The determination of whether the $1^{st}$ or $2^{nd}$ server provides the video program is determined by the controller and loading of the connections between such servers. The process then proceeds to Step 202 where the $3^{rd}$ server causes the video program to be recorded in its associated RAID. The process then proceeds to Step 204 where the $3^{rd}$ server services the $2^{nd}$ concurrent additional request for the program via its associated RAID and an assigned splicer.

At Step 206, a plurality of concurrent additional requests is received for accessing the same video program. The process then proceeds to Step 208 where a determination is made as to whether the number of requests exceeds the number of servers within the system. The process then proceeds to Step 210 for branching based on the outcome of Step 208. When the requests do not exceed the number of servers, the process proceeds to Step 212. At Step 212, the video program is provided to a number of servers, which corresponds to the number of requests being processed. As such, if 5 requests are received for the same program, then 5 servers support the 5 requests where 1 server supports 1 request. The process then proceeds to Step 214 where each of the plurality of servers causes the video program to be stored in its associated RAID. The process then proceeds to Step 216 where each of the plurality of servers independently services one of the concurrent additional requests via their associated RAIDs and an assigned splicer.

Figure 8:
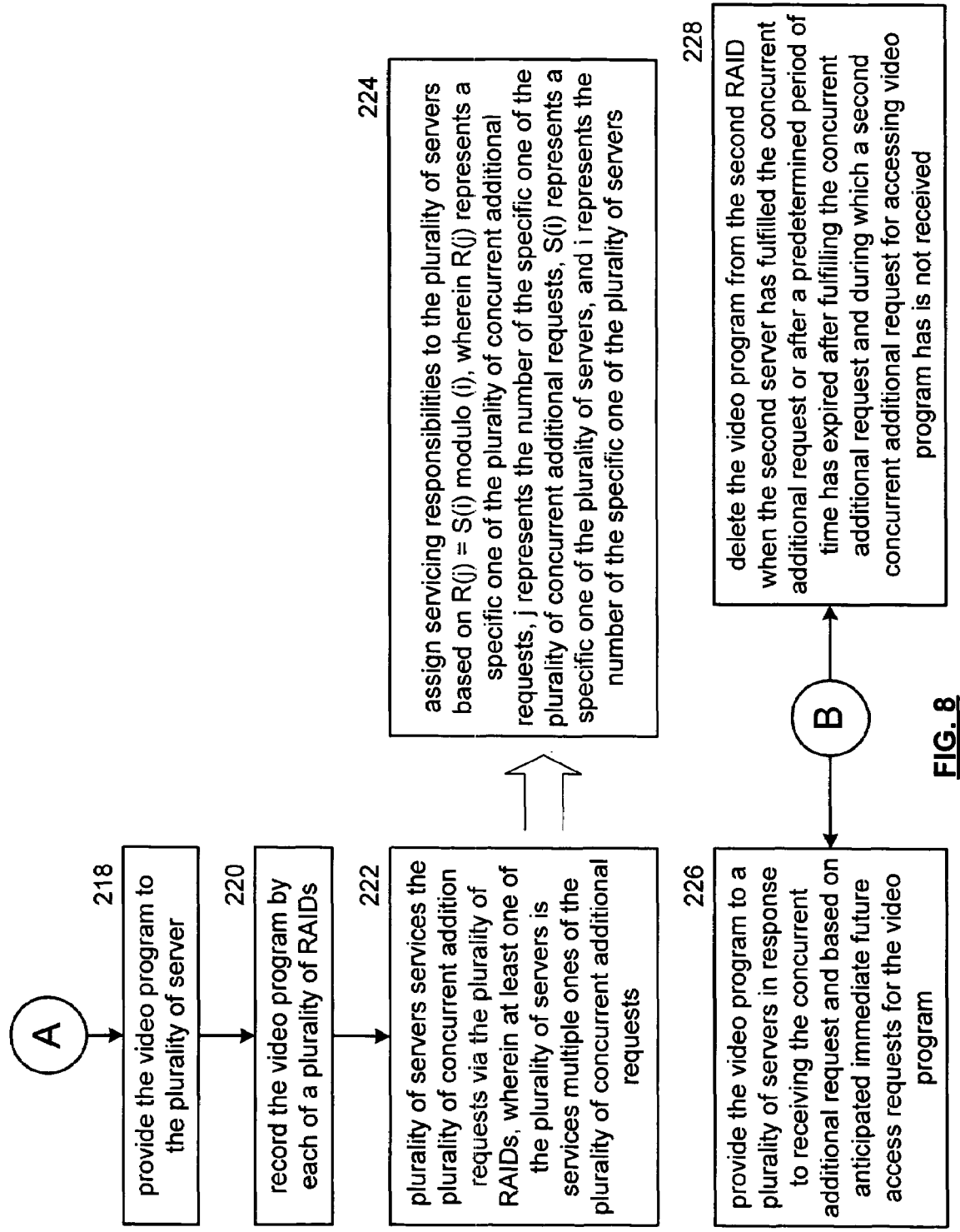

If the number of requests exceeds the number of servers, the process proceeds to Step 218, which is shown in FIG. 8. At Step 218, the video program is provided to all of the servers within the system. The process then proceeds to Step 220 where each of the servers causes the video program to be recorded by its associated RAID. The process then proceeds to Step 222 where the plurality of servers service the additional requests for the program. In this instance, at least 1 of the servers is servicing multiple requests. For example, if the system has 5 servers and 6 requests are being processed, then the $1^{st}$, or primary, server will process two of the requests, while the remaining servers each process one of the requests.

The determining of which server will process which request and how many requests a server will process is illustrated in Step 224. At Step 224, service responsibilities are assigned to the plurality of servers based on the equation $R(j)=S(i)_{modulo}$ (i), where $R_j$ represents a specific 1 of the plurality of concurrent additional requests, J represents the number of the specific request, $S_i$ represents the specific server and i represents the number of specific servers. For example, if the system includes 5 servers, then i is 5. Thus, for request 1, server 1 will process the request, for request 2, server 2 will process the request, for request 3, server 3 will process the request, for request 4, server 4 will process the request, for request 5, server 5 will process the request. When the $6^{th}$ request is received, the modulo math intervenes such that the $1^{st}$ server now also processes the $6^{th}$ request. The $2^{nd}$ server processes the $7^{th}$ request, the $3^{rd}$ server processes the $8^{th}$ request, et cetera. Thus, as the number of requests increase, the distribution of processing will follow the equation as illustrated. As one of average skill in the art will appreciate, there is a variety of ways in which to distribute loading of supporting the video programs in accordance with the present concept of having multiple servers having independent access to a copy of a video program. As one of average skill in the art will also appreciate, a video program may include video data, audio data, and/or text data.

At Step 226, which is also shown in FIG. 8, the video program may be provided to a plurality of servers in response to receiving one or more concurrent additional requests. This may be done in anticipation of immediate future access request for the video program. For example, if the video program is a newly released movie that had good success at the box office, and the $1^{st}$ release date is Friday, the controller could cause the plurality of servers to each store the video program at 6:30 p.m. on Friday such that at 7:00 p.m., when the anticipated requests are received, the servers are ready to process the plurality of requests.

At Step 228, once the $2^{nd}$ server has completed processing the concurrent additional requests, it deletes the video program from its associated RAID. Alternatively, the server may cause the video program to be stored in its associated RAID for a predetermined time after the expiration of fulfilling the concurrent request. This enable the $2^{nd}$ server to process a subsequent request that is received within the predetermined period of time without having to recopy the program into its associated RAID.

Figure 9:
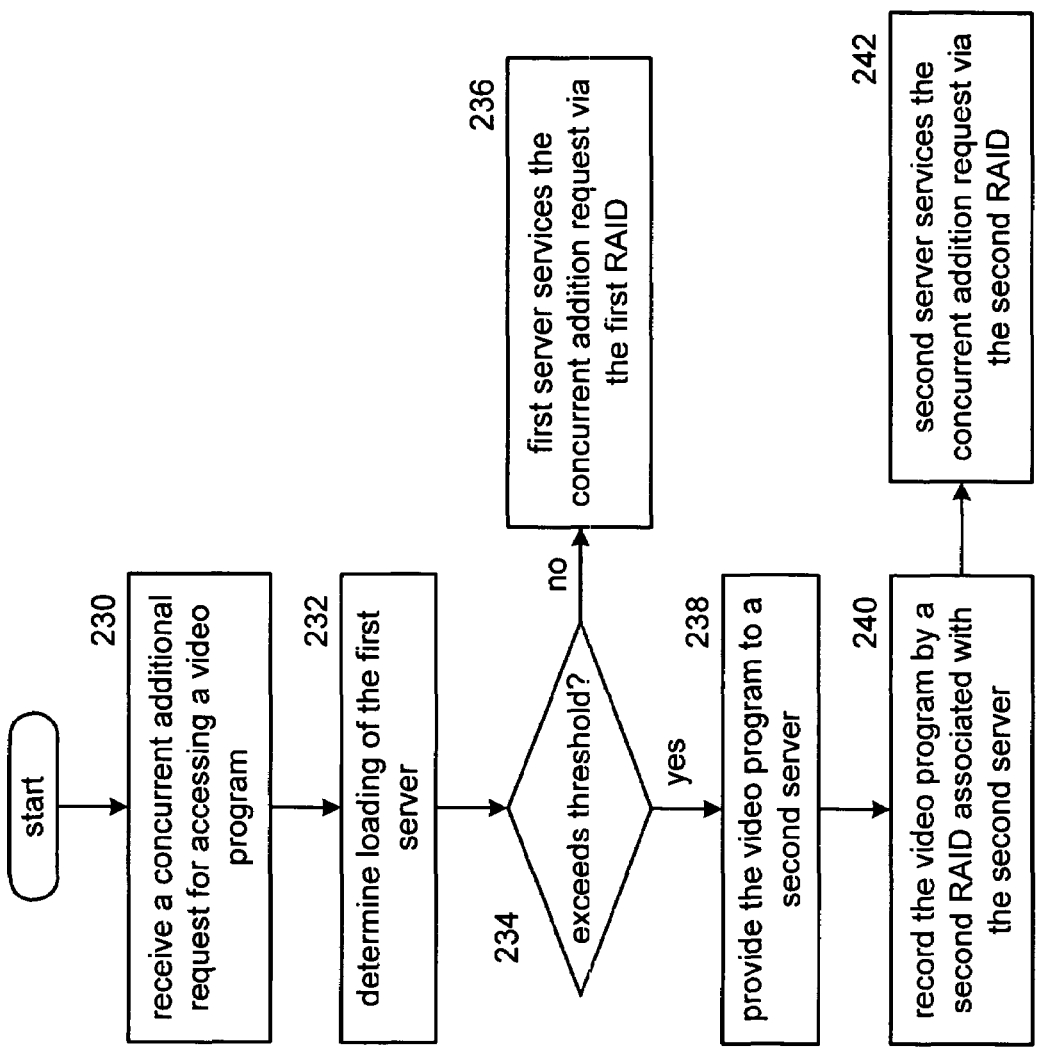
FIG. 9 illustrates a logic diagram of an alternate method for providing video programs to a plurality of users in accordance with the present invention.

FIG. 9 illustrates a logic diagram of an alternate method for distributing video-on-demand loading within the system of FIG. 2 and/or FIG. 6. The process begins at Step 230 where a concurrent additional request for accessing a video program is received. The process then proceeds to Step 232 where a determination is made as to the loading of the $1^{st}$ server. The determination may be based on a number of video programs that the $1^{st}$ server is supporting in comparison with the number of video programs serviced by each of the other servers within the system.

The process then proceeds to Step 234 where a determination is made as to whether the loading of the $1^{st}$ server exceeds a distributed loading threshold. The distributed loading threshold may be a dynamic threshold based on the overall loading of the system. For example, if it is determined that the $1^{st}$ server is supporting 3 programs while the other servers within the system are not supporting any programs, the threshold may be set low such that when the additional request is received, the threshold would be exceeded. If, however, the system is relatively busy where the other servers are supporting near the same number of programs as the $1^{st}$ server, the threshold may not be exceeded.

If the threshold is not exceeded, the process proceeds to Step 236 where the $1^{st}$ server services the concurrent additional request via its RAID. If, however, the threshold is exceeded, the process proceeds to Step 238. At Step 238, the $1^{st}$ server provides the video program to the $2^{nd}$ server.

The process then proceeds to Step 240 where the $2^{nd}$ server causes the video program to be recorded by its associated RAID. The process then proceeds to Step 242 where the $2^{nd}$ server services the concurrent additional request via its associated RAID.

As one of average skill in the art will appreciate, if a $2^{nd}$ concurrent additional request is received while the $1^{st}$ and $2^{nd}$ servers are processing the request, the $2^{nd}$ additional request will follow the processing steps of Steps 230–234. If the threshold were exceeded for $1^{st}$ server, but not the $2^{nd}$ server, then the $2^{nd}$ server would support the request. If, however, the threshold for both the $1^{st}$ and $2^{nd}$ were exceeded, then the video program would be provided to a $3^{rd}$ server, which would cause the video program to be stored in its associated RAID such that it could support the additional request.

If further concurrent requests were received, the processing of Steps 230–234 would be processed with respect to other servers in the system. As the number of requests increase, the number of servers supporting the requests will increase such that the processing steps of Steps 230–242 would be followed with respect to each of the servers. Note that once each of the servers are supporting the request, and an additional request is received, the modulo processing as described with reference to Step 224 of FIG. 8 is utilized in conjunction with the processing steps of Steps 230–242 to determine which of the servers will support the additional requests.

Figure 10:
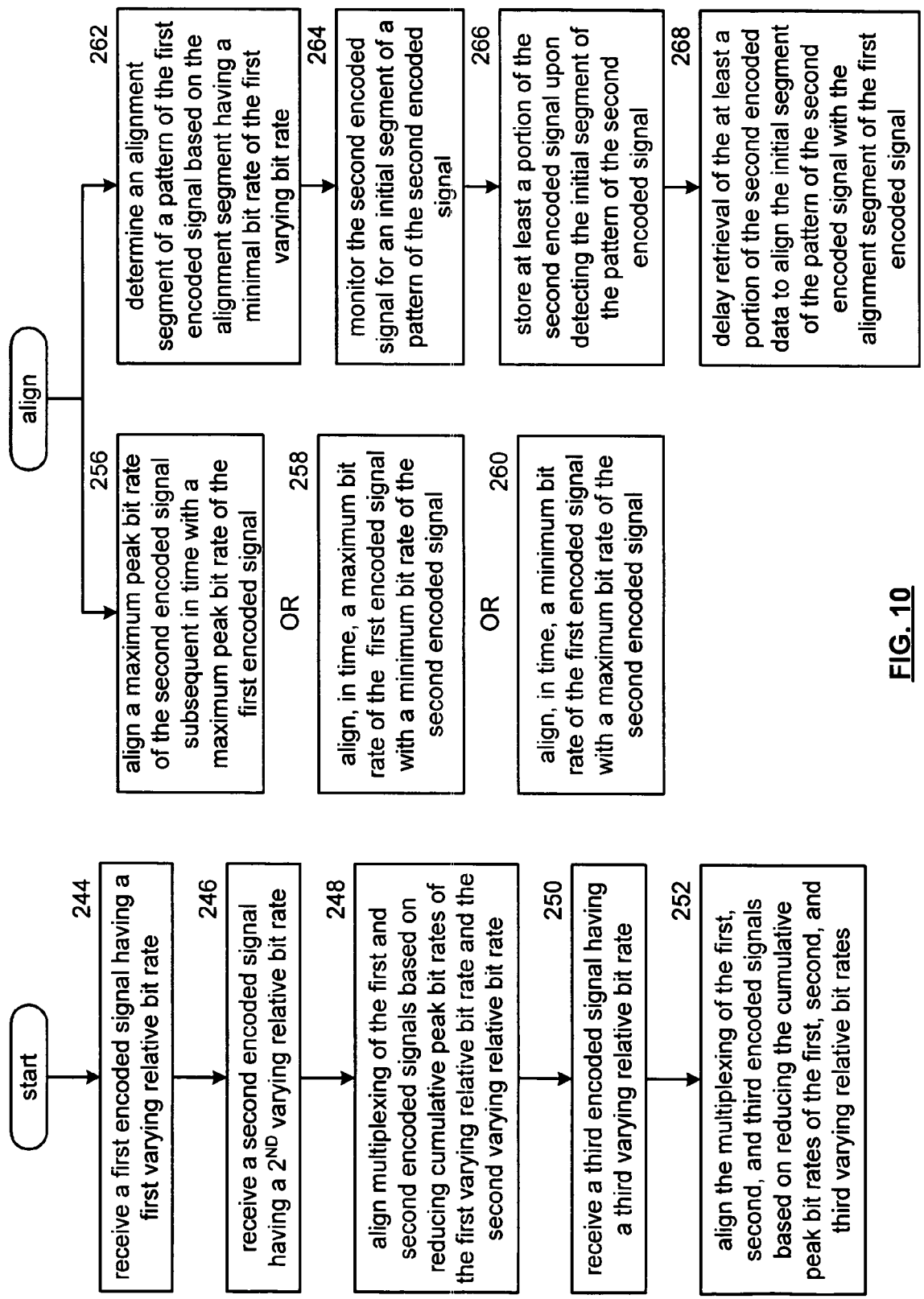
FIG. 10 illustrates a logic diagram of a method for reducing bandwidth of multiplexed signals within a video-on-demand system in accordance with the present invention.

FIG. 10 illustrates a logic diagram of a method for distributed load multiplexing of multiple encoded signals over a shared communication path within a video-on-demand system such as the one shown in FIG. 2 or 6. The process begins at Step 244 when a $1^{st}$ encoded signal having a $1^{st}$ varying relative bit rate is received. For example, the $1^{st}$ encoded signal may be an MPEG encoded signal, an encrypted signal, PCM encoded signal, et cetera wherein the encoding of the data is not consistent over time thereby producing the varying relative bit rate. For example, an MPEG encoded signal includes I frames, B frames and P frames. I frames generally include 20 kilobytes of information, P frames include 5 kilobytes of information and B frames include 2 kilobytes of information. As such, the relative bit rate for an MPEG encoded signal varies.

The process then proceeds to Step 246 where a $2^{nd}$ encoded signal having a $2^{nd}$ varying relative bit rate is received. The process then proceeds to Step 248 where the multiplexing of the $1^{st}$ and $2^{nd}$ encoded signals is aligned based on reducing cumulative peak bit rates of the $1^{st}$ varying relative bit rate and the $2^{nd}$ varying relative bit rate. Note that the multiplexing of 2 signals includes interleaving as done within the splicers of the system shown in FIGS. 2 and 6. The aligning of multiplexing will be graphically illustrated below with reference to FIGS. 11–14.

The process may proceed to Step 250 where a $3^{rd}$ encoded signal having a $3^{rd}$ varying relative bit rate is received. The process then proceeds to Step 252 where the multiplexing of the $1^{st}$, $2^{nd}$ and $3^{rd}$ encoded signals is aligned based on reducing the cumulative bit rates of the $1^{st}$, $2^{nd}$ and $3^{rd}$ varying relative bit rates. The aligning done at Steps 252 and 248 may be done such that, when the $1^{st}$, $2^{nd}$ and $3^{rd}$ signals are MPEG signals, the pattern of the $2^{nd}$ encoded signal (i.e., the group of pictures) is aligned with the group of pictures for the $1^{st}$ and $3^{rd}$ encoded signals such that the I frames of each of the encoded signals are not aligned. Alternatively, the pattern of the $1^{st}$, $2^{nd}$ and $3^{rd}$ encoded signals (i.e., the group of pictures) may be aligned such that the I frame of the $2^{nd}$ encoded channel is time aligned, within a particular quantized time interval containing a B frame of the $1^{st}$ and $3^{rd}$ encoded signals. Similarly, the I frame of the $1^{st}$ encoded signal would be aligned with B frames of the $2^{nd}$ and $3^{rd}$ encoded signals. As a further alternative, the $1^{st}$, $2^{nd}$ and $3^{rd}$ encoded signals may be aligned such that the I frame of the $2^{nd}$ encoded channel is time aligned with a P frame of the $1^{st}$ encoded signal and the I frame of the $3^{rd}$ encoded signal is time aligned with a P frame of the $2^{nd}$ encoded signal.

The aligning performed in Steps 248 and 252 may be further described with reference to Steps 256, 258, 260 or Steps 262–268. At Step 256, a maximum peak bit rate of the $2^{nd}$ encoded signal is aligned to be subsequent in time (i.e., in a subsequent quantized time interval) with the maximum peak bit rate of the $1^{st}$ encoded signal. If the $1^{st}$ and $2^{nd}$ signals are MPEG encoded signals, then the I frame of the $2^{nd}$ encoded signal is aligned subsequent in time to the I frame of the $1^{st}$ encoded signal. To perform such aligning of signals, the servers require buffering mechanisms to store the data until pulled by the assigned splicer as indicated by the controller.

As an alternative, the processing of Step 258 may be utilized, which aligns, in time, a maximum bit rate of the $1^{st}$ encoded signal with a minimum bit rate of the $2^{nd}$ encoded signal. For example, the I frame of an MPEG encoded signal may be time aligned (i.e., use the same quantized time interval) as a B frame of another MPEG encoded signal or a time interval having a least cumulative bit rate.

As yet another alternative, at Step 260, a minimum bit rate of the $1^{st}$ encoded signal is time aligned with the maximum bit rate of the $2^{nd}$ encoded signal. For example, if both signals are MPEG encoded signals, a B frame of the $1^{st}$ encoded signal would be time aligned with an I frame of the $2^{nd}$ encoded signal.

As yet another alternative, the Steps 262–268 may be utilized. At Step 262, a determination is made with respect to an alignment segment of a pattern of the $1^{st}$ encoded signal based on the alignment segment having a minimal bit rate of the varying bit rate. For example, if the $1^{st}$ encoded signal is an MPEG encoded signal, the alignment segments correspond to I frames, B frames and/or P frames. The pattern of I frames, B frames and P frames is a group of pictures. The process then proceeds to Step 264 where a $2^{nd}$ encoded signal is monitored for an initial segment of a pattern of the $2^{nd}$ encoded signal. For example, if the $2^{nd}$ encoded signal is an MPEG encoded signal, the pattern includes I frames, P frames and B frames where the initial segment corresponds to an I frame.

The process then proceeds to Step 266 where at least a portion of the $2^{nd}$ encoded signal is stored upon detecting the initial segment of the pattern of the $2^{nd}$ encoded signal. The process then proceeds to Step 268 where the retrieval of at least a portion of the $2^{nd}$ encoded signal is delayed to align the initial segment of the $2^{nd}$ encoded signal with the alignment segment of the $1^{st}$ encoded signal.

FIGS. 11–14 illustrate a graphical representation of distributed load multiplexing of multiple encoded signals over a shared communication path within a video-on-demand system. FIGS. 11 and 12 illustrate a $1^{st}$ and $2^{nd}$ encoded signal 270 and 276. Each is shown on a graph wherein the horizontal axis corresponds to a quantized interval 274 and the vertical axis corresponds to bits per quantized interval 272. For MPEG encoded signals, the quantized time interval corresponds to the frame rate of the encoded signal. For example, the frame rate may be 30 frames per second, 60, 75 or 90 frames per second. As such, the quantized intervals 274 corresponds to $\frac{1}{30}$, $\frac{1}{60}$, $\frac{1}{75}$, $\frac{1}{90}$, et cetera. The bits per quantized interval 272 correspond to the bits per associated frame of the signal. As previously mentioned, I frames have approximately 20 kilobytes of information, B frames have approximately 5 kilobytes of information and B frames have approximately 2 kilobytes of information. Note that the system clock rate far exceeds the I frame per quantized interval rate such that multiple encoded signals may be interleaved via a single path. For example, if the frame rate is 30 frames per second, then the quantized interval is $\frac{1}{30}^{th}$ of a second. For a 38.5 Mbps connection, the connection can support approximately 1.28 Mbits per quantized time interval (38.5 Mbps/30 sec). Since an I frame includes 20 kilobytes of information, each quantized time interval may support multiple programs. By ensuring that I frames from various programs are not aligned as in the present invention, each quantized time interval may support many more programs than when it cannot be guaranteed that the I frames from various programs will not be aligned, as in the system of FIG. 1. For instance, with a bandwidth of 1.28 Mbits per time interval, the system of FIG. 1 could only reliably support 8 different programs (e.g., 1.28 Mbits/20 Kilobytes). In contrast, the present invention reliably supports at least 15 different programs and up to 30 different programs depending of the group of pictures (GOP). For example, if a GOP includes 1 I frame, 4 P frames, and 10 B frames, and, for the first 15 programs, the I frames are staggered as to not coincide in the same time interval, then each time interval is supporting approximately 480 Kbits of data (20 Kbytes for its one I frame, 20 Kbytes for the 4 P frames, and 20 Kbytes for the 10 B frames). Theoretically, for such a GOP structure, the present invention at 1.28 Mbits per interval could support 30 different programs.

FIG. 13 illustrates the $1^{st}$ and $2^{nd}$ encoded signals 270 and 276 being time aligned. In this illustration, the $1^{st}$ quantized time interval includes only the I frame of the $1^{st}$ encoded signal 270. During the next quantized time interval, the P frame of the $1^{st}$ encoded signal and the I frame of the $2^{nd}$ encoded signal are processed. As such, the $2^{nd}$ encoded signal 276 is delayed by 1 quantized time interval from the $1^{st}$ encoded signal such that the I frames within a particular quantized interval are not cumulative. As such, the bits per quantized interval is more stabilized throughout the processing of the system. In addition, by staggering the I frames of encoded signals, more encoded signals may be supported by a single channel than if the encoded signals were time aligned or unmonitored where the worse case condition of when the I frames were time aligned would have to be accommodated.

As one of average skill in the art would appreciate, if a $3^{rd}$ encoded signal were received, it would be delayed two quantized intervals such that it would correspond with a B frame of the $1^{st}$ encoded signal and a P frame of the $2^{nd}$ encoded signal. Similarly, a $4^{th}$ encoded signal would be delayed 3 quantized intervals.

FIG. 14 illustrates an alternate approach to delaying the $2^{nd}$ encoded signal 276 from the $1^{st}$ encoded signal 270. In this instance, the bits per quantized interval for each quantized interval is maintained. By maintaining this data, the quantized interval having the most bits per interval is known, the interval having the least bits per interval is known, as well as the bits per interval of all of the other intervals. As such, when a new encoded signal is to be processed, a time interval having the least bits per interval may be selected. In this example, when only the $1^{st}$ encoded signal 270 was processed, the smallest quantized interval corresponded to a B frame.

If a 3$^{rd}$ encoded signal were added to the illustration of FIG. 14, the I frame of the 3$^{rd}$ encoded signal would be delayed 2 cycles such that the I frame of the 3$^{rd}$ encoded signal would correspond to the P frame of the 1$^{st}$ encoded signal and a B frame of the 2$^{nd}$ encoded signal. This process would continue for each additional encoded signal added to the channel.

As one of average skill in the art will appreciate, even though the load distribution is better balanced as illustrated in FIGS. 13 and 14, a situation may arise where the bandwidth of the particular channel has been saturated for a given time interval. When this occurs, a B frame is occasionally dropped from one of the encoded signals to enable data to be transmitted over the channel. In contrast to prior video-on-demand systems, when a channel became saturated, the 188 kilobytes of information would be lost as opposed to a single B frame in the present embodiments. Such a loss of data would be visibly detectable by the user, while the loss, or repeating of a single B frame is most often not visibly detectable by the user.

Figure 15:
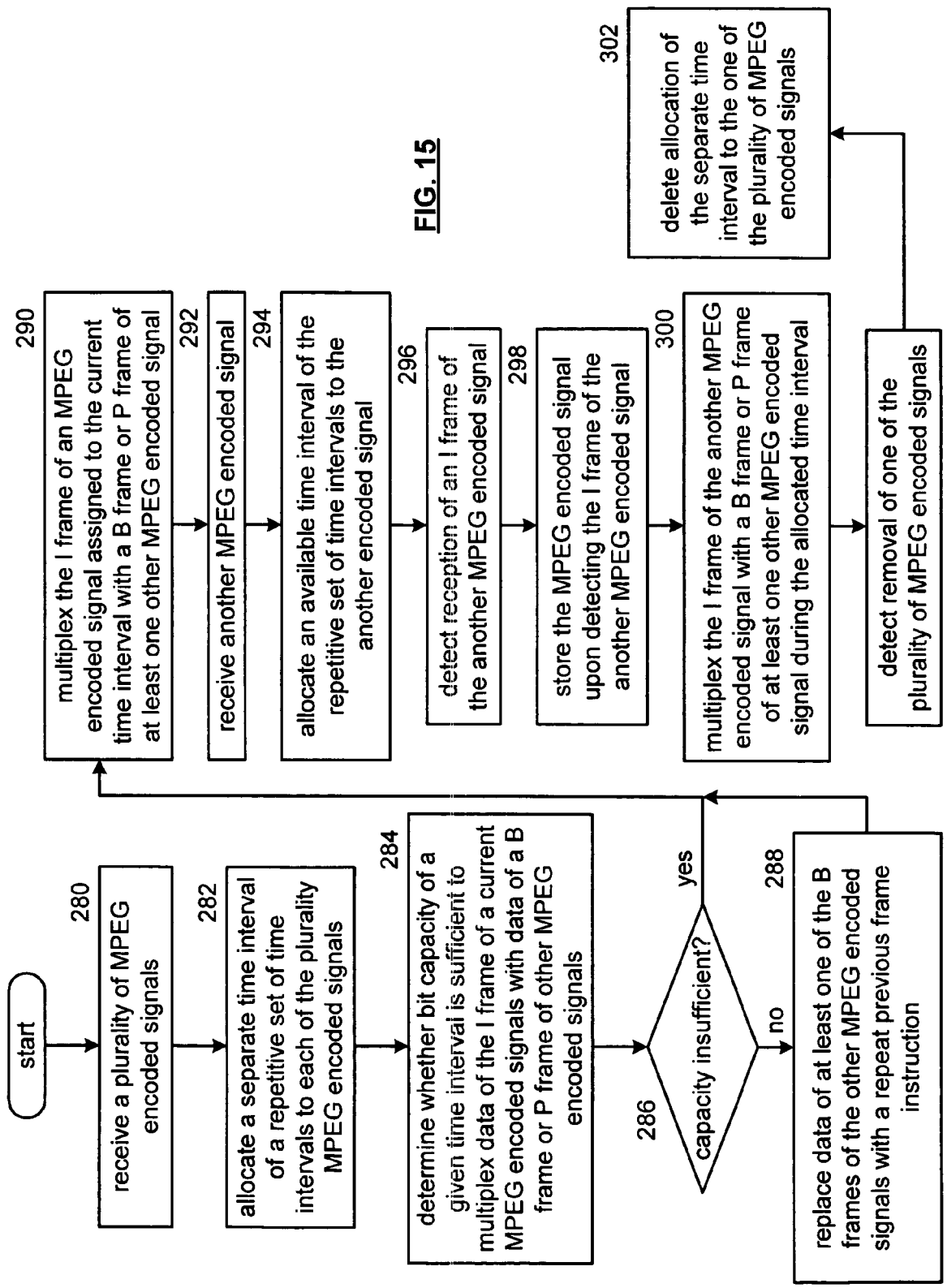
FIG. 15 illustrates a logic diagram of an alternate method for reducing bandwidth requirements of multiplexed encoded video signals within a video-on-demand system in accordance with the present invention.

FIG. 15 illustrates a logic diagram of an alternate method for a distributed load multiplexing of multiple encoded signals of a shared communication path in a video-on-demand system. The process begins at Step 280 where a plurality of MPEG encoded signals is received. Each of the MPEG encoded signals includes a repetitive pattern of I frames, P frames and B frames. The repetitive pattern is generally referred to as a group of pictures. The process then proceeds to Step 282 where a separate time interval of a repetitive set of time intervals is allocated to each of the MPEG encoded signals. This corresponds to the illustration of FIG. 13. The allocation is done based on minimizing the cumulative bit peak requirements for any one of the repetitive sets of time intervals. The time intervals correspond to the quantized intervals 274 of FIG. 13 or 14. The set of quantized intervals corresponds to the group of pictures. Accordingly, the I frames of each encoded signal is allocated a particular time interval. For example, if the repetitive pattern, or group of pictures includes 16 frames wherein the 1$^{st}$ frame is an I frame, there are 16 time intervals. As such, the 1$^{st}$ encoded signal has its I frame associated with the 1$^{st}$ time interval of the set of time intervals, the 2$^{nd}$ encoded signal has its I frame associated with the 2$^{nd}$ time interval, the 3$^{rd}$ encoded signal with the 3$^{rd}$ time interval, et cetera.

The process then proceeds to Step 284 where the determination is made as to whether bit capacity of a given time interval is sufficient to multiplex data of the I frame of a current MPEG encoded signal with data of a B frame and/or P frame of other MPEG encoded signals. As previously mentioned, as multiple encoded signals are multiplexed as shown in FIGS. 13 and 14, the bit capacity per quantized interval is fixed based on the bandwidth of the path and the frame rate of the encoded data and may be exceeded when the data of programs exceeds the bit capacity of a quantized time interval.

If the capacity of a given time interval (i.e., its bits per interval) is not sufficient, the process proceeds to Step 288. At Step 288, data of at least one of the B frames is replaced with a repeat previous frame instruction. As such, multiple B frames within a given time interval may be omitted and replaced with a repeat previous frame instruction. The processing and generation of a previous frame instruction is known in the art, thus no further discussion will be presented except to illustrate the concepts of the present invention.

If the capacity is sufficient or the data of a B frame has been replaced, the process proceeds to Step 290. At Step 290, the I frame of an MPEG encoded signal assigned to the current time interval is multiplexed with the B and/or P frames of other MPEG encoded signals. This was graphically illustrated with reference to FIGS. 13 and 14. The process then proceeds to Step 292 where another MPEG encoded signal is received. The process then proceeds to Step 294 where an available time interval of the repetitive set of time intervals is allocated to the newly received MPEG encoded signal. This may be done as illustrated in FIG. 13 where the time intervals are assigned in a sequential order or in as done in FIG. 14 where the assignment is based on the time interval of the set of time intervals having the current smallest bit loading.

The process then proceeds to Step 296 where reception of an I frame of another MPEG signal is detected. The process then proceeds to Step 298 where the MPEG encoded signal is stored once the I frame is detected. The process then proceeds to Step 300 where the I frame of the newly received MPEG encoded signal is multiplexed with the B frame or P frame of at least one other encoded MPEG encoded signal during the allocated time interval. The process then proceeds to Step 301 where the removal of an MPEG encoded signal is detected. The process then proceeds to Step 302 where the allocation of the time interval to the deleted MPEG signal is removed. When the allocation of a time interval has been deleted, the allocation of other time intervals to other MPEG encoded signals may be adjusted to better load balance the bits per interval or flag that the time interval is now available for subsequent assignment.

The preceding discussion has presented a method and apparatus for enhancing video-on-demand performance as well as substantially reducing the cost for such a system. By utilizing the teaching and concepts of the present invention, the bottlenecking issues and limitations of previous video-on-demand systems are substantially overcome. As one of average skill in the art will appreciate, other embodiments may be derived from the teaching of the present invention, without deviating from the scope of the claims.

What is claimed is:

1. A method for distributed load multiplexing of multiple encoded signals over a shared communication path, the method comprises:
    receiving a first encoded signal having a first varying relative bit rate;
    receiving a second encoded signal having a second varying relative bit rate;
    aligning multiplexing of the first and second encoded signals based on reducing cumulative peak bit rates of the first varying relative bit rate and the second varying relative bit rate by:
        determining an alignment segment of a pattern of the first encoded signal based on the alignment segment having a minimal bit rate of the first varying bit rate;
        monitoring the second encoded signal for an initial segment of a pattern of the second encoded signal;
        upon detecting the initial segment of the pattern of the second encoded signal, storing at least a portion of the second encoded signal; and
        delaying retrieval of the at least a portion of the second encoded data to align the initial segment of the pattern of the second encoded signal with the alignment segment of the pattern of the first encoded signal.

2. The method of claim 1 further comprises:
    receiving a third encoded signal having a third varying relative bit rate; and
    aligning the multiplexing of the first, second, and third encoded signals based on reducing the cumulative peak bit rates of the first, second, and third varying relative bit rates.

3. The method of claim 1, wherein the first and second encoded signals include Motion Picture Expert Group (MPEG) encoded signals that include a pattern of an intra frame (I frames), predicted frames (P frames), and bi-directional frames (B frames).

4. A method of multiplexing Motion Picture Expert Group (MPEG) encoded signals, the method comprises:
   receiving a plurality of MPEG encoded signals, wherein each of the plurality of MPEG encoded signals includes a repetitive pattern of an intra frame (I frame), predicted frames (P frames), and bi-directional frames (B frames);
   allocating a separate time interval of a repetitive set of time intervals to each of the plurality MPEG encoded signals based on minimizing cumulative bit peak requirements for any one of the repetitive set of time intervals to produce a set of allocated time intervals;
   during each of the set of allocated time intervals, multiplexing the I frame of a corresponding one of the plurality of MPEG encoded signals with a B frame or P frame of at least one of remaining ones of the plurality of MPEG encoded signals;
   detecting removal of one of the plurality of MPEG encoded signals;
   deleting allocation of the separate time interval to the one of the plurality of MPEG encoded signals; and
   adjusting size of the separate time interval to reflect the deallocation.

5. The method of claim 4, wherein the allocating the separate time interval based on minimizing cumulative bit peak requirements further comprises:
   determining bit size of each I frame, B frame, and P frame within the repetitive pattern of the plurality of MPEG encoded signals;
   allocating a first time interval of the set of allocated time intervals to a first one of the plurality of MPEG encoded signals, wherein the I frame of the first one of the plurality of MPEG encoded signals is multiplexed during the first time interval;
   allocating, in a sequential order, remaining ones of the plurality of MPEG encoded signals to given time intervals of the set of allocated time intervals based on the one of the given time intervals that currently has the most bit size available.

6. The method of claim 4 further comprises:
   receiving another MPEG encoded signal;
   scanning the another MPEG encoded signal for an I frame of the another MPEG encoded signal;
   upon detecting the I frame of the another MPEG encoded signal, storing P frames and B frames of the another MPEG encoded signal;
   identifying one of the set of time intervals having most available bits; and
   allocating the one of the set of time intervals having the most available bits to the another MPEG encoded signal to produce an allocated time interval, wherein the I frame of the another MPEG encoded signal is multiplexed during the allocated time interval.

7. The method of claim 4, wherein the multiplexing the I frame of the corresponding one of the plurality of MPEG encoded signals with a B frame or P frame of at least one of remaining ones of the plurality of MPEG encoded signals within a given time interval of the set of allocated time intervals further comprises:
   determining whether bit capacity of the given time interval is sufficient to multiplex data of the I frame of the corresponding one of the plurality of MPEG encoded signals with data of a B frame or P frame of each of the remaining ones of the plurality of MPEG encoded signals; and
   when the bit capacity is insufficient, replacing data of at least one of the B frames of the remaining ones of the plurality of MPEG encoded signals with a repeat previous frame instruction.

8. An apparatus for distributed load multiplexing of multiple encoded signals over a shared communication path, the apparatus comprises:
   processing module; and
   memory operably coupled to the processing module, wherein the memory includes operational instructions that cause the processing module to:
      receive a first encoded signal having a first varying relative bit rate, the first encoded signal including Motion Picture Expert Group (MPEG) encoded signals that include a pattern of an intra frame (I frame), predicted frames (P frames), and bi-directional frames (B frames);
      receive a second encoded signal having a second varying relative bit rate the second encoded signal including Motion Picture Expert Group (MPEG) encoded signals that include a pattern of an intra frame (I frame), predicted frames (P frames), and bi-directional frames (B frames); and
      align multiplexing of the first and second encoded signals based on reducing cumulative peak bit rates of the first varying relative bit rate and the second varying relative bit rate by at least one of:
         aligning the pattern of the second encoded signal with the pattern of the first encoded signal such that the I frame of the second encoded channel is time aligned with a smallest B frame of the pattern of the first encoded signal;
         aligning the pattern of the second encoded signal with the pattern of the first encoded signal such that the I frame of the second encoded channel is time aligned with one of the B frames of the pattern of the first encoded signal; and
         aligning the pattern of the second encoded signal with the pattern of the first encoded signal such that the I frame of the second encoded channel is time aligned with one of the P frames of the pattern of the first encoded signal.

9. The apparatus of claim 8, wherein the memory further comprises operational instructions that cause the processing module to:
   receive a third encoded signal having a third varying relative bit rate; and
   align the multiplexing of the first, second, and third encoded signals based on reducing the cumulative peak bit rates of the first, second, and third varying relative bit rates.

10. The apparatus of claim 8, wherein the first and second encoded signals include Motion Picture Expert Group (MPEG) encoded signals that include a pattern of an intra frame (I frames), predicted frames (P frames), and bi-directional frames (B frames).

11. An apparatus for distributed load multiplexing of multiple encoded signals over a shared communication path, the apparatus comprises:
   processing module; and
   memory operably coupled to the processing module, wherein the memory includes operational instructions that cause the processing module to:
      receive a first encoded signal having a first varying relative bit rate;
      receive a second encoded signal having a second varying relative bit rate; and align multiplexing of the first and second encoded signals based on reducing cumulative peak bit rates of the first varying relative bit rate and the second varying relative bit rate by:
  determining an alignment segment of a pattern of the first encoded signal based on the alignment segment having a minimal bit rate of the first varying bit rate;
  monitoring the second encoded signal for an initial segment of a pattern of the second encoded signal;
  upon detecting the initial segment of the pattern of the second encoded signal, storing at least a portion of the second encoded signal; and
  delaying retrieval of the at least a portion of the second encoded data to align the initial segment of the pattern of the second encoded signal with the alignment segment of the pattern of the first encoded signal.

12. The apparatus of claim 11, wherein the memory further comprises operational instructions that cause the processing module to:
  receive a third encoded signal having a third varying relative bit rate; and
  align the multiplexing of the first, second, and third encoded signals based on reducing the cumulative peak bit rates of the first, second, and third varying relative bit rates.

13. The apparatus of claim 11, wherein the first and second encoded signals include Motion Picture Expert Group (MPEG) encoded signals that include a pattern of an intra frame (I frame), predicted frames (P frames), and bi-directional frames (B frames).

* * * * *